A. A. Wilder,

Wood Planing Machine.

No. 249. Reissued Nov. 15, 1853.

AM. PHOTO-LITHO. CO. N.Y. (OSBORNE'S PROCESS)

UNITED STATES PATENT OFFICE.

ARETUS A. WILDER, OF DETROIT, MICHIGAN.

IMPROVEMENT IN MACHINERY FOR PLANING LUMBER.

Specification forming part of Letters Patent No. 9,495, dated December 21, 1852; antedated July 17, 1852; Reissue No. 249, dated November 15, 1853.

*To all whom it may concern:*

Be it known that I, ARETUS ANDREWS WILDER, of Detroit, in Wayne county, and State of Michigan, have invented certain new and useful Improvements in Machinery for Planing Lumber; and I do hereby declare that the following is a full, clear, and exact description thereof, reference being had to the accompanying drawings, and to letters of reference marked thereon, in which—

Figure 1:
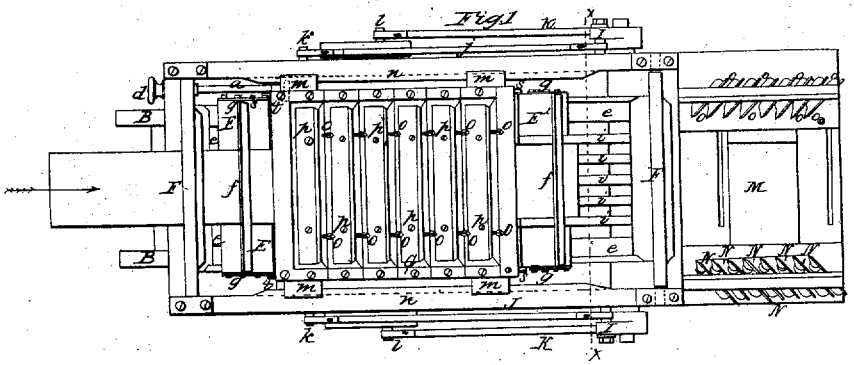
Figure 2:
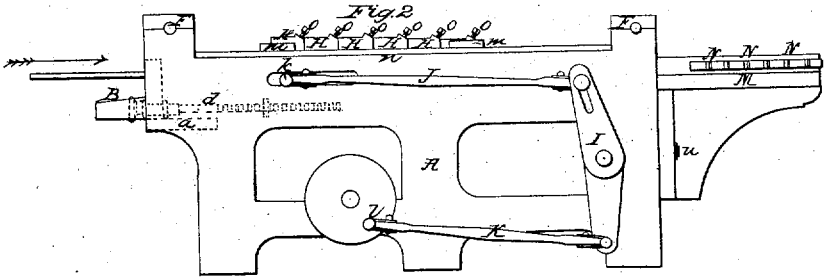
Figure 3:
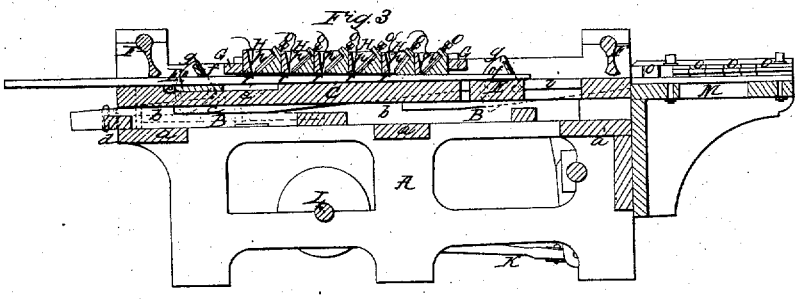
Figure 4:
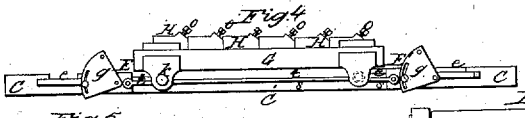
Figure 5:
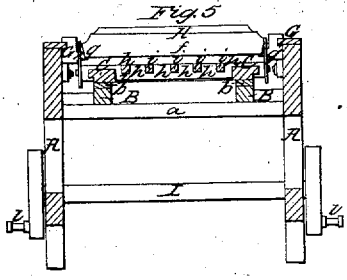
Figure 6:
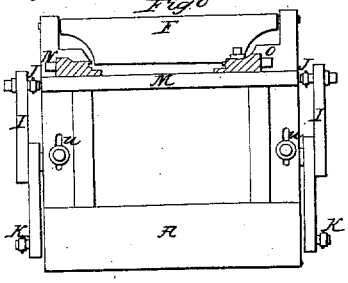

Figure 1 is a plan or top view of the machine. Fig. 2 is a side elevation. Fig. 3 is a central longitudinal section. Fig. 4 is a side view of the main and sliding beds, with the cutter-stock frame. Fig. 6 is a transverse section taken on the line *x x* of Fig. 1. Fig. 6 is an elevation of the rear end of the machine.

The nature of my improvements consist in constructing planing-machines so that the board to be planed can be clamped to the reciprocating bed while being fed by the backward motion of the planes, so that the board will be free to move over the stationary bed-plate upon which it is planed.

To enable others to make and use my invention, I will proceed to describe the construction and operation of the machine, together with my improvements.

I construct a substantial frame of suitable size and form, as represented in the drawings by the letter A, having cross-bearings *a* from side to side, above which and resting on them is a sliding frame, B, with inclined planes *b* on its upper side corresponding with and fitting against inverted inclines *c* on the under side of the main bed C. This sliding frame is movable longitudinally by means of the screw *d*, for the purpose of elevating or depressing the main bed to adjust it to the various thicknesses of lumber to be planed, which is effected by the inclined planes on the frame passing under in opposition to those in the under side of the bed, which insures a solid bearing to said bed, and is very essential in finishing the lumber of equal thickness. This bed has no lateral or longitudinal motion. The face of it is formed with recesses *e*, near to each end, across it, in which slide the reciprocating sectional beds E E′, the faces of which are slightly raised above the level of the main bed to prevent the lumber from bearing too hard on the main bed while being fed into the machine. These reciprocating beds are connected with each other by side rods, S, and have attached to them dogs *f*, which are hung in segmental brackets *g* at each end of said beds, whereby they can be adjusted to suit the thickness of the lumber. The use of these beds and dogs is to draw the lumber into the machine and feed it into the side cutters by their backward motion. Returning, they pass freely under and over it while it is held fast by the dogs F, which are mounted in suitable journals at each end of the frame, and which clamp the board between them and the main bed to prevent it from receding while under the action of the surfacing-planes. The reciprocating bed E′ is formed so that the center part of it sinks into or through an opening in the main bed, the under sides of each being on the same level, leaving only sufficient substance of metal in each side of the main bed to form slides for the reciprocating bed to slide on, and to allow of recesses or grooves *h* across its face in the direction of its motion, which admit of a grating or series of bars, *i*, through said grooves, being attached to and on a level with the main bed, in order that the lumber may have a solid bearing under the last knife in whatever position this reciprocating bed may be, which, if it were constructed like the one at the opposite end of the main bed, would leave a vacancy under the last knife-stock when at the rear end of its stroke, which would allow the board to spring away from the knife and therefore be irregular in thickness. The frame G, which carries a series of knife-stocks, H, bolted to it transverse to and above the bed, is supported by bearings *m* on the slides *n* on either side of the frame A, and on which it travels, having a reciprocating motion imparted through the rock-shaft arms I, which are connected with the wrist-pins *k* on said frame G by the connecting-rods J at either side of said frame, the rods K connecting the downward arms of the rock-shaft with crank-pins *l* on either end of the shaft L, which is driven by any suitable driving-gear. To this frame G are attached the sliding beds by the rods *t*, thereby imparting a like reciprocating motion to them. The knife-stocks H are graduated on their under side, each one rearward a shade lower than that in advance of it, the face or under side of each in its cross-section being perfectly parallel with the bed, and having its permanent mouth-piece *r* cut away on the under side to the level of the heel of the knife-stock in advance of it. Thus the heel of the knife-stock and its mouth-piece take an equal bearing on the board, the knife being adjusted by the set-screws *o*, and secured to the stock by bolts *p*, so that its edge is exactly even with the heel of the knife-stock. Thus the difference between the level of the mouth-piece and that of the heel of the stock will be the thickness of the shaving that each plane will take off, which is gradually reduced on each knife-stock until the last knife takes the thinnest possible shaving, putting a fine finish on the lumber. At the rear end of the machine is attached a table, M, formed with brackets, and bolted to the main frame by bolts *u*, fitting in slots, so as to adjust its level to suit that of the main bed. On this table, at one side, is bolted fast a series of tonguing-planes, N. At the other side is a corresponding series of grooving planes and jointers, O. The bolts which secure these to the table are fitted in slots, so as to set them nearer to or farther from the tonguing-planes, and thus adapt them to the width of the lumber to be tongued and grooved. These siding-planes are arranged in like manner to the surfacing-planes, each one rearward cutting deeper than that in advance.

In operating this machine the lumber is fed in as indicated by the arrow on the drawings, and is caught by the dog on the reciprocating bed and pulled in by its backward motion, on the return motion of which the board is held fast by the stationary dog F, while the planes pass over it to the extent of their stroke, when it is again pulled in by the backward motion, as before, and so on alternately, and when it has passed the surfacing-planes is fed into or between the siding-planes by the back action of the reciprocating beds and dogs, whereas the surfacing is performed during their forward motion, thus equalizing as far as possible the amount of work performed throughout the entire revolution of the driving-shaft.

Having thus described my invention and improvement in machines for planing, tonguing, and grooving boards, I disclaim the invention of planing by a reciprocating plane which planes on its forward stroke and feeds the board on its backward stroke the whole distance of the stroke of the plane, as in other machines of this class: but

What I do claim is—

1. The reciprocating beds arranged with respect to the stationary beds substantially as described, in combination with the clamps or their equivalents, attached to them, whereby the board is clamped between said movable beds and the clamps and is free to move over the stationary planing-bed, and is fed during the backward stroke of the planes the whole length of said stroke.

2. The within-described method, or any substantially the same, of clamping and feeding lumber to knives or chisels.

In testimony whereof I have hereunto signed my name before two subscribing witnesses.

ARETUS A. WILDER.

Witnesses:

THOMAS M. SCOFIELD,
WILLIAM O. MEEL.